(12) United States Patent
Ferreira et al.

(10) Patent No.: US 11,880,403 B2
(45) Date of Patent: Jan. 23, 2024

(54) DOCUMENT DATA MANAGEMENT VIA GRAPH CLIQUES FOR LAYOUT UNDERSTANDING

(71) Applicant: EMC IP Holding Company LLC, Hopkinton, MA (US)

(72) Inventors: Paulo Abelha Ferreira, Rio de Janeiro (BR); Pablo Nascimento da Silva, Rio de Janeiro (BR); Rômulo Teixeira de Abreu Pinho, Rio de Janeiro (BR); Vinicius Michel Gottin, Rio de Janeiro (BR)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 196 days.

(21) Appl. No.: 17/450,400

(22) Filed: Oct. 8, 2021

(65) Prior Publication Data
US 2023/0114965 A1   Apr. 13, 2023

(51) Int. Cl.
| | |
|---|---|
| *G06F 16/00* | (2019.01) |
| *G06F 16/35* | (2019.01) |
| *G06N 20/00* | (2019.01) |
| *G06V 30/412* | (2022.01) |
| *G06V 30/418* | (2022.01) |

(52) U.S. Cl.
CPC ........... *G06F 16/355* (2019.01); *G06N 20/00* (2019.01); *G06V 30/412* (2022.01); *G06V 30/418* (2022.01)

(58) Field of Classification Search
CPC ..... G06F 16/355; G06F 16/906; G06N 20/00; G06V 30/412; G06V 30/418
See application file for complete search history.

(56) References Cited

U.S. PATENT DOCUMENTS

| | | | |
|---|---|---|---|
| 8,275,608 B2* | 9/2012 | Ah-Pine ............... | G06F 40/295 704/10 |
| 2003/0033295 A1* | 2/2003 | Adler .................... | G06F 16/332 |
| 2005/0094206 A1* | 5/2005 | Tonisson .............. | G06F 40/186 358/1.18 |
| 2005/0182571 A1* | 8/2005 | Kim .................. | G06F 16/90344 707/E17.039 |
| 2009/0037389 A1* | 2/2009 | Kothari ................ | G06F 40/194 |
| 2012/0102033 A1* | 4/2012 | Sarshar ................ | G06F 16/683 707/E17.084 |
| 2013/0185630 A1* | 7/2013 | Ahmadullin .......... | G06F 40/186 715/243 |

(Continued)

*Primary Examiner* — Noosha Arjomandi
(74) *Attorney, Agent, or Firm* — Workman Nydegger

(57) ABSTRACT

One example method includes, for each document in a group of annotated documents, extracting a set of words from the annotated document, and each of the words is positioned in a respective field of the annotated document. The method further includes using an aggregation function to determine, for one of the fields, a similarity of each one of the annotated documents to all of the other annotated documents, creating a document layout graph with nodes that each correspond to a respective annotated document, and each node is connected to all other nodes for which a similarity threshold for the one field has been met, and running an algorithm on the document layout graph to identify a clique of the annotated documents, and each annotated document in the clique has a similar layout to respective layouts of the other annotated documents in the clique.

16 Claims, 9 Drawing Sheets

(56) References Cited

U.S. PATENT DOCUMENTS

| | | | |
|---|---|---|---|
| 2015/0310647 A1* | 10/2015 | Matange | G06T 11/206 |
| | | | 345/440 |
| 2016/0063881 A1* | 3/2016 | Brinton | G09B 5/02 |
| | | | 434/353 |
| 2018/0081862 A1* | 3/2018 | Zhao | G06F 40/106 |
| 2018/0081885 A1* | 3/2018 | Glueck | G06Q 10/103 |
| 2018/0121546 A1* | 5/2018 | Dingwall | H04L 63/10 |
| 2020/0257761 A1* | 8/2020 | Bull | G06F 40/289 |
| 2021/0124779 A1* | 4/2021 | Jagota | G06F 16/906 |
| 2021/0240793 A1* | 8/2021 | Andreica | G06F 40/169 |
| 2021/0295527 A1* | 9/2021 | Shin | G06T 7/181 |
| 2021/0319177 A1* | 10/2021 | Pito | G06F 40/284 |
| 2022/0300762 A1* | 9/2022 | Hasegawa | G06F 18/2113 |
| 2022/0343073 A1* | 10/2022 | Bar-Haim | G06F 40/279 |
| 2023/0111052 A1* | 4/2023 | Ray | G06F 40/242 |
| | | | 704/9 |
| 2023/0114965 A1* | 4/2023 | Ferreira | G06V 30/412 |
| | | | 707/737 |

* cited by examiner

DOCUMENT DATA MANAGEMENT VIA GRAPH CLIQUES FOR LAYOUT UNDERSTANDING

FIELD OF THE INVENTION

Embodiments of the present invention generally relate to the extraction of information from unstructured documents. More particularly, at least some embodiments of the invention relate to systems, hardware, software, computer-readable media, and methods for evaluating a document, which may possess intrinsic layout information, so as to establish a basis for selecting a content extraction approach to be applied to that document.

BACKGROUND

Extracting information from a document, and classifying the document layout, is a difficult research problem that presents at least three different challenges. First, the document layout classification must be performed in an efficient and automatic way. Second, information may be spread throughout the document in an unstructured manner. Third, there may be a relatively high layout variability within a group of documents, and between groups of documents. For example, the documents employed by one party may be quite different from those employed by another party, and even within the context of a single party, the document layouts may vary significantly. Various approaches have been devised in an attempt to deal with problems such as those just noted. Some approaches for information extraction assume quasi-fixed spatial location of values of interest in the document. With this assumption, one can build an ad-hoc "punch-through" method, where values of interest are extracted from roughly fixed bounding boxes across a "stack" of documents. Since low variability is expected intra-type, that is, within a single type of document, "punch-through" is expected to work well for the same type. There are situations, however, where the quasi-fixed assumption does not hold, and it is difficult to tell when punch-through is viable without visual inspection of the documents.

In more detail, document information, such as key/value field pairs for example, is typically spread throughout the documents in an unstructured manner, with varied layouts. In the domain of purchase orders, for example, some types of documents have pre-defined layouts that can easily be understood and may not vary much from one document to the next, such as orders from the same customers, while other documents do not follow any layout template. On the one hand, a sophisticated machine learning model applied to such "fixed" or template-based layouts may just "memorize" the template and may have very poor generalization capabilities to process documents with higher layout variability. On the other hand, a positional method that leverages prior knowledge about templates will tend to be very imprecise if a key or value field is not at the expected location.

In addition, even in template-based documents, some fields tend to float around the pages if they depend on the position of another field. A classic example in the case of purchase orders are fields that come after a table with a list of items, or after fields with free text. As a result of such a document layout, a document may need to be processed by both a positional method and a sophisticated ML (machine learning) model on a field-by-field basis. This approach is time-consuming, complicated, and may not produce good, or predictable, results, that is, effective and reliable information extraction from the document.

Knowing whether to process a document using a positional method, or an ML method, is extremely challenging without visual inspection of the document. However, such visual inspection is detrimental to the efficiency of the document processing, even if an automatic extraction approach has been implemented to process the documents. Furthermore, the inspection is largely a menial task from the perspective of the operators, who could concentrate on more productive tasks instead.

In view of considerations such as those noted above, problems involved in with extracting content from a document may be summarized as comprising the following elements. Static or quasi-fixed layout documents benefit from position-based methods, which are fast, cheap and accurate for these cases. Richer approaches like ML models are capable of dealing with dynamic layouts, but are negatively impacted, at least in terms of cost, time and accuracy, by having to consider numerous documents of static layout as part of their training set. Finally, determining whether a set of documents comprises a static layout with respect to a field is time-consuming and non-trivial, particularly for large databases of documents that may be incrementally changed over time.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Figure 1:
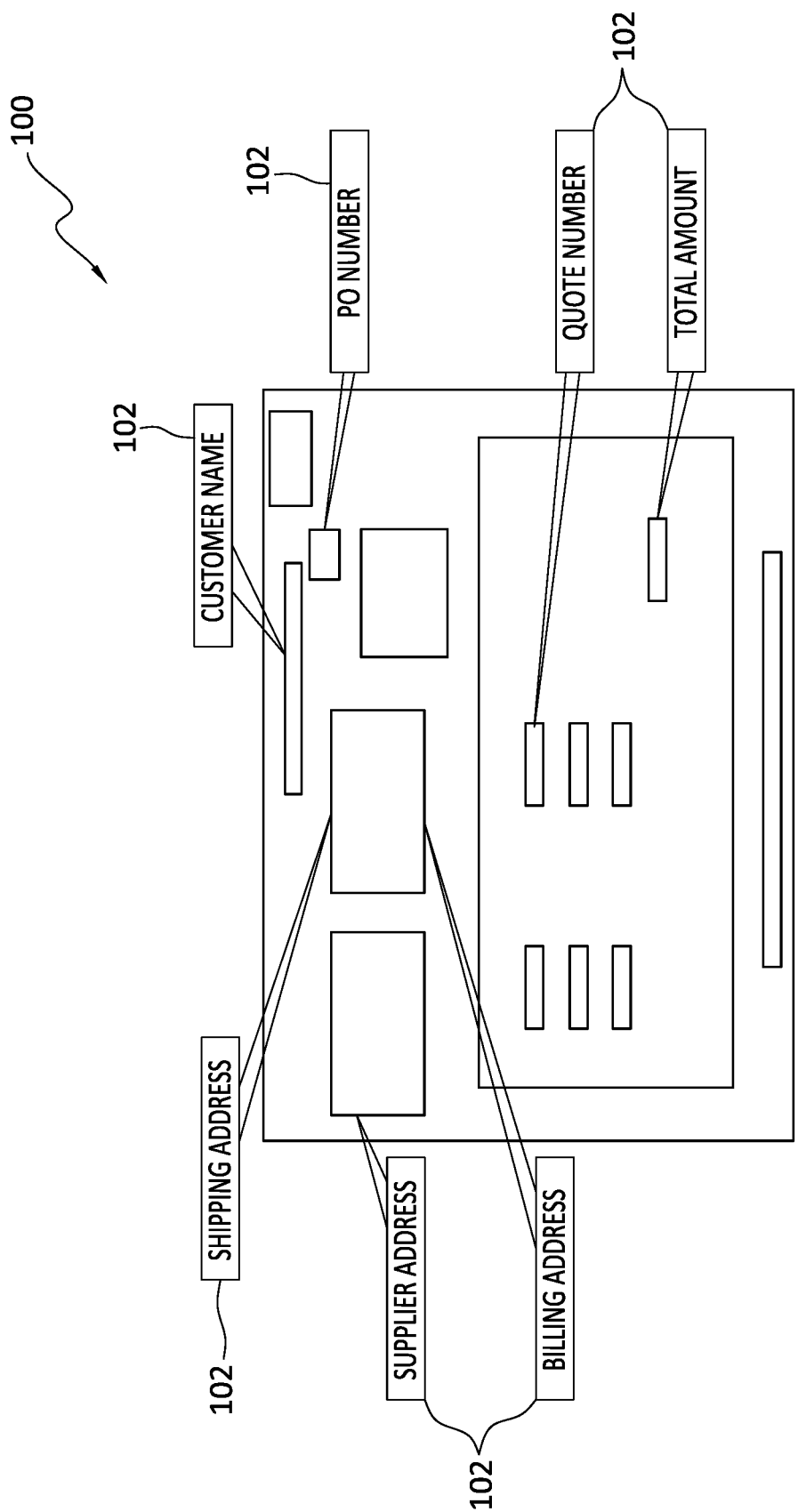
FIG. 1 discloses aspects of an example document and entities (fields) whose values are targeted for extraction FIG. 2 discloses a visual representation of a quasi-fixed positional method (punch-through method) applied to two sets of documents, targeting a specific field.

Embodiments of the present invention generally relate to the extraction of information from unstructured documents. More particularly, at least some embodiments of the invention relate to systems, hardware, software, computer-readable media, and methods for evaluating a document, which may possess intrinsic layout information, so as to establish a basis for selecting a content extraction approach to be applied to that document.

In general, example embodiments of the invention concern content extraction from documents of various different physical and/or digital formats, examples of which include, but are not limited to, scanned image formats such as formats produced by using an OCR (optical character recognition) process, and PDF (portable document file). Example embodiments may, among other things, provide an automatic, adaptive and efficient solution for dealing with a large number of documents, may implement a clique discovery method for grouping similar layouts together, and may be capable of continuous learning. In some embodiments, a method is provided that automatically decides, on a field-by-field basis, which information extraction method should be applied in each situation. This approach may also be able learn new template-based representations automatically, so that the addition of new templates does not break the existing automated pipelines.

Some particular embodiments of the invention include a method to decide whether a document database, or a subset of the document database, lends itself to the "punch-through" content extraction method or not. Such embodiments may assume that documents are in PDF or scanned image formats, from which words and their bounding boxes can be extracted. Example embodiments of the method may rely on the existence of keywords associated with fields of interest, that is, words that typically appear near the field values to be extracted. Thus, if documents from a given type, such as purchase orders from the same customer, have keywords at quasi-fixed locations, then the "punch-through" method of content extraction may be expected to work well. As well, documents intra-customer and inter-customer may be classified into layout groups, the overall variability of which may determine the applicability, or not, of per-group punch-through.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, one advantageous aspect of at least some embodiments of the invention is that embodiments may select, from a defined group of different content extraction approaches, the content extraction approach best suited, in terms of efficiency and effectiveness for example, to a particular type and/or group of documents. An embodiment may operate to group documents with similar layouts together. An embodiment may operate in an ongoing learning mode so as to improve accuracy of document identification, and content extraction. An embodiment may be able to learn new template-based representations for positional field extraction automatically over time. Various other features and advantages of example embodiments will be apparent from this disclosure.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods processes, and operations, are defined as being computer-implemented.

A. OVERVIEW

Digital transformation and AI (artificial intelligence) can greatly contribute to the field of data management. One important aspect of data management is document data management, where automatic digital processing can greatly improve efficiency and compliance. Many big players are already developing AI methods for data management when processing internal and customer documents.

The idea of information extraction from documents can improve data management techniques by allowing for automatic methods to understand, sort and process documents from different customers and documents. Companies may greatly benefit from having an automatic and low-cost method for obtaining this information to classify or extract content for process automation or compliance purposes of internal and customer document data.

Companies may have an interest in extracting information from unstructured documents with intrinsic layout information, such as scanned documents, and text-based PDFs, for example. Internal company standards may require the correct classification, labeling and protection of data, documents and emails. As well, such internal company standards may impose a categorization according to well-defined rules based on the origin, destination, purpose, and content of the information.

In either of these cases, there may be specific information which the company wants to extract from the documents. Some companies may be particularly interested, as an example domain use-case, in information from POs (purchase orders) made by company customers. When a customer wants to buy products from the company, a PO document must be sent with all information regarding the list of products the customer wants to buy, the delivering address, contact information, quote number, and other details. Then this document is read by a company employee, who manually checks if all the information is correct, which is time-consuming. Thus, example embodiments may resolve this problem by automatically identifying and extracting a set of fields from unstructured documents to extract and/or understand and classify relevant parts of its content.

With attention now to the example document 100 of FIG. 1, some documents may typically include a set of 'fields' that carry the information on the sensitivity, origin, destination, purpose and/or content, of the information contained inside the document. As shown in the example of FIG. 1, the document 100 may include fields 102 such as, but not limited to: shipping address; supplier address; billing address; customer name; PO (purchase order) number; quote number; and, total amount due. The identification of the fields 102, and their respective values, or content, may enable processes such as automatic extraction of content from the document, and an actual or suggested classification for the document 100. In some instances, certain fields 102/information of the document 100 may be hidden or redacted.

A difficulty presented by documents such as the document 100 is that the information may be spread throughout the document 100, and similar documents, in an (unstructured manner, with varied layouts from one document to another. The lay out variability makes automation challenging and often requires very specialized and sophisticated systems. In effect, and despite the existence of commercial solutions addressing information extraction from documents, the problem remains open and is one of the main subjects in state-of-the-art research in the intersections between computer vision and natural language processing.

Nonetheless, there may be situations in which document layouts from the same source, such as a customer or vendor, or across different sources vary only a little, or at least in an immaterial way. Indeed, layouts may sometimes be reasonably fixed that even a positional method, that is, a method that assumes a fixed position for a field and its value, might work well. Assuming the existence of keywords, defined as special words associated with a field, typically by proximity, a method may rely on the existence of such keywords associated with fields of interest, that is, words that typically appear near the field values targeted for extraction from the document.

Thus, if documents from a given customer have keywords at quasi-fixed locations, then a so-called "punch-through" method may be expected to work well—that is, a method that searches for the information at an expected location in the document. Another insight into the problem is that documents intra- and inter-types may be classified into layout groups, the overall variability of which may determine the applicability and viability of per-group punch-through. In the most general formulation, documents may be associated to a type, such as a customer for example, and documents of the same, or different, types may pertain to a common layout group, for example, different customers that use a common template for their purchase order documents. In other cases, documents of a same type may not belong to the same, or a common, layout group, for example, customers that use several alternative templates for their purchase orders, or customers that use templates with high intra-document variability in the locations of their fields.

With these considerations in view, example embodiments of the invention may operate to automatically decide when information from a document is amenable to being extracted via a positional method, which typically addresses low-variability layouts, or via a more sophisticated method such as ML for example, which typically addresses high-variability layouts. This adds one layer in the automation process described above, sparing operators from the burden of visual inspection and speeding up the information extraction process for relatively simple documents with low-variability layouts.

In more detail, embodiments of the invention may implement an approach that decides, in an adaptive way, when a document lends itself to being processed by a punch-through method, or a ML method, for a given field, or group of fields, of a document or group of documents. Embodiments may implement a clustering method based on graph cliques to identify which documents should be processed by which method. Additionally, example embodiments may operate to classify intra-type variability of layout for document management and analysis. In some embodiments, a method may be performed that automatically decides, such as on a field-by-field basis for example, which information extraction method should be applied in each situation. Such method may be able to learn new template-based representations automatically, so that the addition of new templates does not break or impair the existing automated document evaluation and data extraction pipelines.

B. SOME BACKGROUND CONCEPTS RELATING TO EXAMPLE EMBODIMENTS

One concept relating to example embodiments of the invention concerns the extraction of words from documents. In some embodiments, it may be assumed that a document is capable of being pre-processed, so as to generate a list of words and the physical coordinates of their corresponding bounding boxes in the document. This task may be executed, via OCR for example, if the document is in the form of scanned images. Various commercial and open source OCR tools presently exist, such as Tesseract for example. Alternatively, a document in digital form, such as the PDF form, may already contain the required information in the desired format. Open-source programming libraries and frameworks exist that support the extraction of words and graphical elements from such documents, such as "pdfplumber2" for the Python programming language.

Another concept concerns object detection with deep learning. Particularly, ML has been successfully applied in the filed of object detection, especially with the advent of DL (Deep Learning) and large-scale image datasets, such as detecting faces on camera images as used by most commercially available phones when taking pictures. At least some of the success of the use of ML is attributable to supervised learning, a process in which a set of known examples is given to a DL model during the training phase. The model is able to learn how to output detections that are close to the correct ones through adjustment based on one or more error metrics. Once the model has been trained, one can use it for inference, where objects can be detected in images previously unseen by the model.

Graph cliques may also relate to some example embodiments. Graphs are powerful data structures that may be able to model many different types of relationships. As used herein, a 'graph' embraces, but is not necessarily limited to, a pair containing a set of vertices and a set of edges, each edge joining exactly two vertices. The set of vertices or edges may be empty. For instance, in one example use case for an embodiment of the invention, each document is a node in the graph, and an edge connecting two documents represents similarity, that is, relatively low layout divergence, between the documents.

Example graphs according to some embodiments may be referred to as undirected graphs, that is, the edges of such a graph do not have directionality or extend in any particular direction. Rather, the edges of an undirected graph simply represent whether or not a connection, such as similarity, exists or not between two or more documents. For undirected graphs, reference is made herein to the concept of a clique, which is a subset of vertices such that all vertices have an edge connecting them, that is, a complete subgraph. Reference is also made herein to the concept of maximal cliques, that is, cliques that cannot be further expanded by including adjacent vertices. In some use cases, these maximal cliques may form groups where all documents belonging to a same maximal clique have similar layouts as each other. As explained in more detail below, example embodiments may cluster similar layouts together through a method of finding cliques in a graph defined by the words, and their respective positions, in the document.

C. ASPECTS OF SOME EXAMPLE EMBODIMENTS

Example embodiments embrace, among other things, a method for determining whether a document database, or a subset of it, lends itself to being processed, on a field-by-field basis, by a quasi-fixed field positional extraction method or not. If not, consideration may be given to whether more complex, and more expensive, methods such as ML may be required.

A punch-through method is one example of such a positional method. In general, the punch-through method relies on the existence of keywords associated with fields of interest, that is, words whose location are somehow associate to the field values targeted for extraction from the document. Thus, if documents from a given type, such as a customer for example, have specific "keywords" at quasi-fixed locations, then the punch-through method of data extraction may be expected to work well. Further, according to some embodiments, documents intra-type and inter-type may be classified into layout groups, such as based on their similarity to each other or lack thereof, the overall variability of which may determine the applicability of per-group punch-through.

In some embodiments, a reference document a may be analyzed and the positional information of a target field recorded. An example of a target field is, or may comprise, a bounding box that encompasses the words comprising the value associated to that field. This positional information is given relative to an identifying keyword, or set of keywords. Then, for each other document, the word or words within that same position are collected as possible values for the target field. The definition of keywords is described in further detail elsewhere herein.

Empirical observations of such example embodiments have validated that this method yields a high accuracy result for well-behaved, quasi-static documents of a same template, or layout. A visual representation of an example embodiment of the method, as applied to two sets of documents, is disclosed in FIG. 2.

Figure 2:
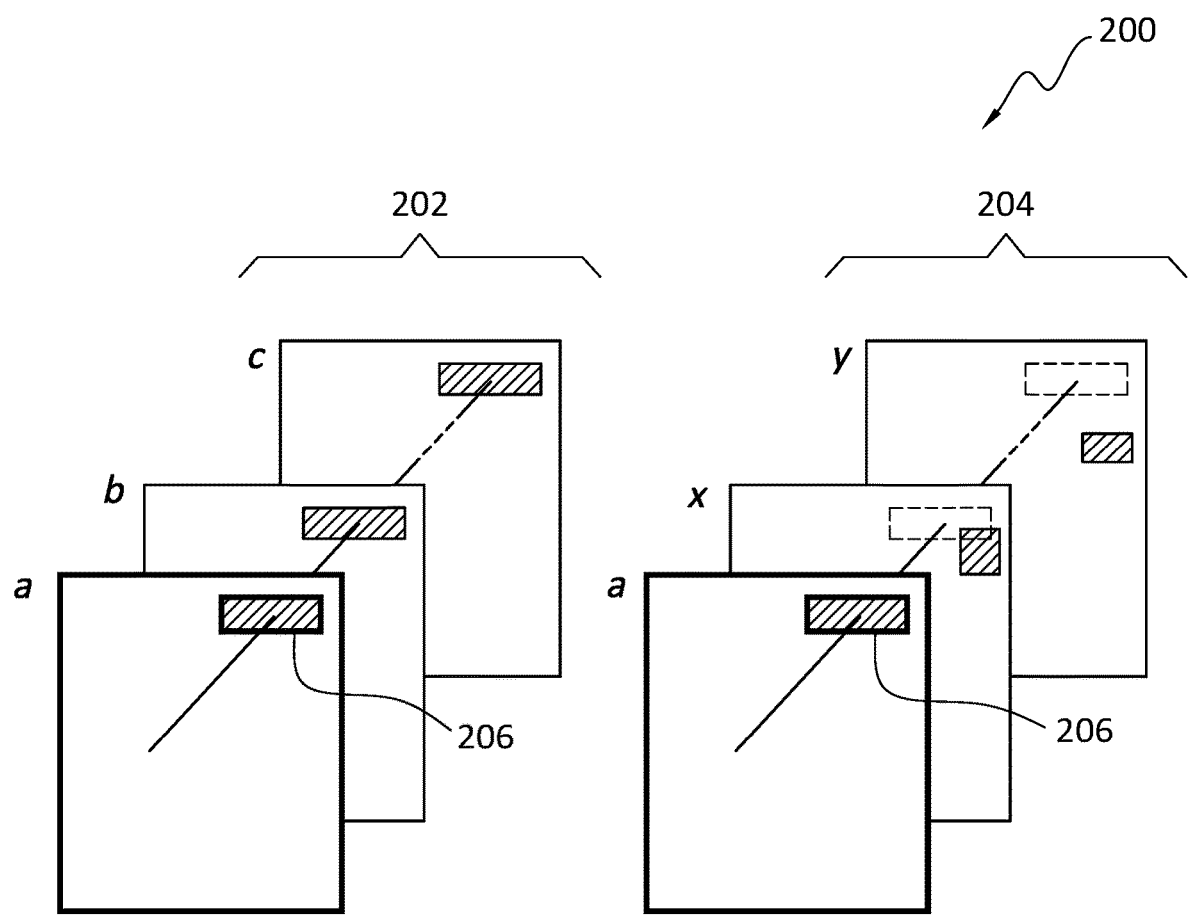

Particularly, FIG. 2 discloses a visual representation 200 of a quasi-fixed positional method, such as the punch-through method for example, as applied to two sets 202 and 204 of documents, and targeting a specific field 206. In FIG. 2, it can be seen how the punch through method works well for a generally static document template, but does not work as well for a dynamic document template. Particularly, with regard to the set 202 of documents where the field 206 is largely, or completely, static in terms of its position in the documents, the punch through method is applied to documents a, b, and c, of a common template, and finds the same field 206 in each document with high accuracy.

On the other hand, it can be seen in FIG. 2 how, for a dynamic template where field size, orientation, and/or location, may vary from one document to another, the punch through method is ineffective. Particularly, with regard to the set 204 of documents, the punch-through method is applied to varying documents a, x, and y, and fails to correctly identify the field 206 in documents x and y. In this latter case, more complex methods like ML models may be required. As noted earlier herein, determining whether a simple positional method could be applied may be desirable.

Figure 3:
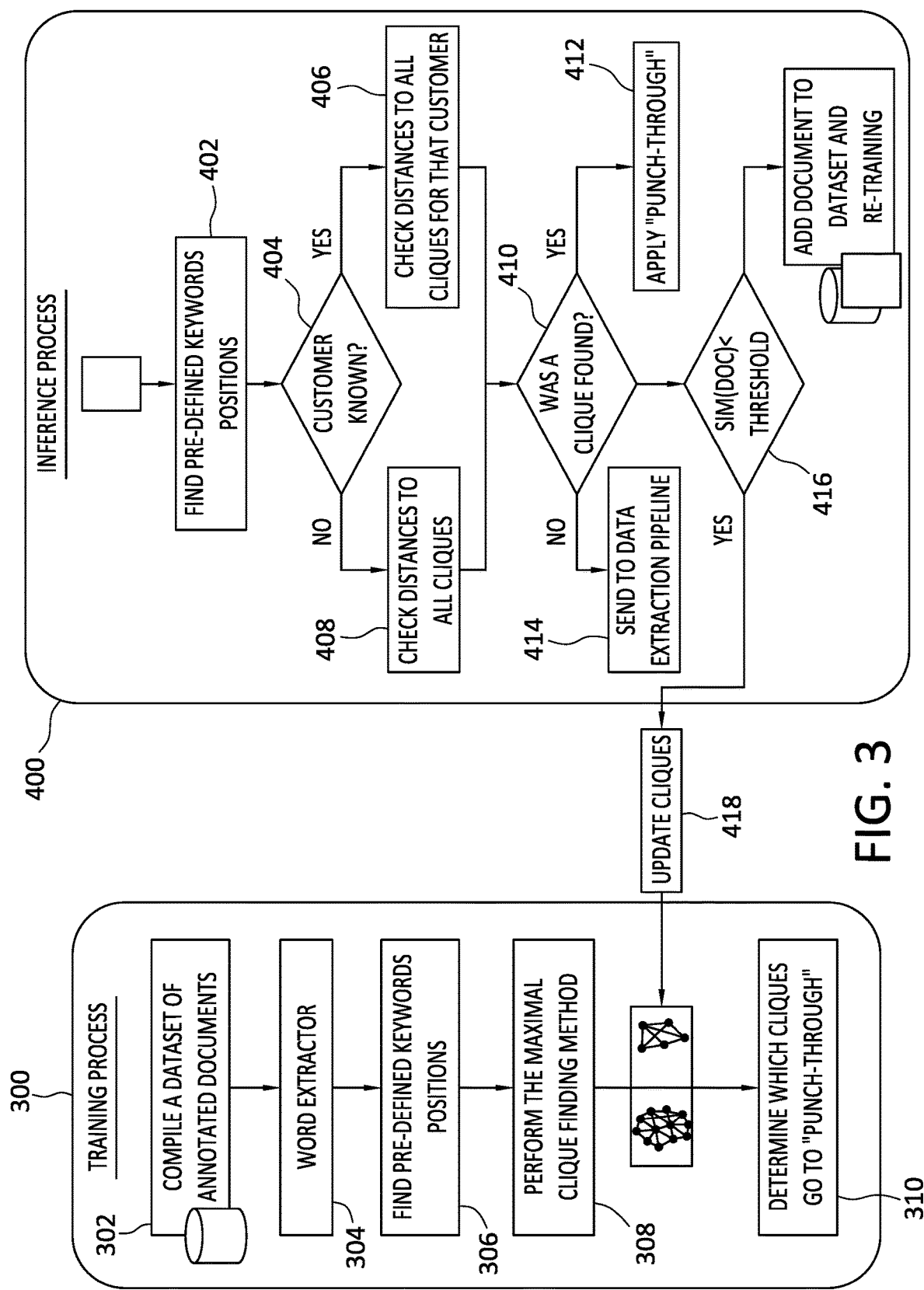
FIG. 3 discloses example training and inference processes.

Accordingly, and with reference now to the example of FIG. 3, details are provided concerning some aspects of an ML method for field location and data extraction. For the purposes of discussion, it is assumed that documents are in PDF, or scanned image, formats, from which words and their bounding boxes can be extracted.

In general, some example embodiments of the invention are directed to a method that has a training phase, and an inference phase. FIG. 3 discloses examples of each, namely, an ML training method 300, and an ML inference method 400.

With reference first to the ML training method 300, that method may begin by compiling 302 a database of annotated documents that include one or more field values of interest. Next, a word extractor, such as an OCR or a PDF reading tool for example, may process 304 the database of documents to obtain words and their positions in a digitized document. After the processing 304 has been performed, pre-defined keywords and their positions in each document may be found 306.

Next, a maximal clique finding method 308 may be performed. In general, and as discussed in more detail below, the maximal clique finding method 308 may comprise comparing all documents to see which ones have similar keyword positions, and which also belong to the same clique in a graph that represents document proximity. Finally, a determination may be made 310 as to which cliques of documents do, or do not, lend themselves to information extraction using the punch-through method. In general, this determination 310 may be made by analyzing clique sizes.

With continued reference to FIG. 3, the example inference method 400, which may be performed on one or more given documents, may begin with the extraction 402 of pre-defined keywords and their positions from a document. If the document type is determined 404 to be known, then its distance to all cliques from that type may be checked 406. Note that in this example, the document type refers to the customer who owns/uses the document. Thus, determining a document type 404 may comprise determining the customer to whom the document belongs, and/or determining what person or entity is the custodian/user of the document. If it is determined 404 that the document type is not known, the distance from the document to all known cliques may be checked 408.

In either case, that is, 406 or 408, the method 400 may proceed to determine 410 if a clique is found for the document and, if so, metadata may be checked to see if the punch-through method can be applied with an acceptable level of confidence. If the punch-through method can be applied with acceptable confidence, the punch-through method may be applied 412 to the document. On the other hand, if a clique is found for the document, but it is determined that the punch-through method cannot be applied with an acceptable level of confidence, the document may be routed to another data extraction pipeline.

After the clique determination 410 has been performed, an evaluation 416 may be performed to determine how the document compares with an established similarity threshold. If the similarity of the document is below the threshold, the clique to which the document belongs may be updated 418. For example, the document may be removed from its present clique, and moved to another clique where the similarity of the document to other documents in the new clique meets or exceeds the similarity threshold. One the other hand, if the document is determined 416 to meet or exceed the similarity threshold, the document may be added 420 to the database, and a retraining process performed with the new document.

C.1 Example Training Processes

An example training process, such as an ML training process, may involve, among other things, data gathering and labeling. In some instances, the training process may assume that labeled data is available. This assumption may not apply in all cases, in practice, as some embodiments of the example method may be applied to domains where human annotation of documents is the current practice. Thus, labeled data may be annotated by, and obtained from, a computing entity, or may comprise data annotated by humans using an annotations tool. As another example, labeled data may be obtained from the usage of document processing software where one could possibly match documents that have been previously processed with their processed information. Any of these methods could serve as a source of labeled data required for the application of example embodiments of the method. The set of documents for which the field information is known may be referred to herein as the annotated documents.

Example training processes according to some embodiments of the invention may also comprise word extraction, and keyword finding. That is, such embodiments may involve the double task of (i) extracting words from the document, and then (ii) assigning a subset of those words as keywords in the labelled dataset. Examples of these processes are disclosed in FIG. 4, which indicates an example pipeline, or method 500, for word extraction and keyword finding.

The word extraction task may comprise processes and programming libraries as described earlier herein. Performance of a word extraction task may result in a list of words with their corresponding bounding boxes, where a bounding box may comprise positional information concerning the physical position of the word relative to the document, and page size, as well as graphical elements such as lines, and logos, for example.

The definition of keywords, that is, words or phrases that comprise a representative set of layout-related tokens, may be employed in example embodiments. Particularly, in some example embodiments, keywords are words from the documents whose frequency location are associated in some way with the occurrence and location of document fields whose keys and values targeted for extraction. Some embodiments may assume that keywords are known a priori. Keywords may be provided by domain experts and operators, for example, the workers tasked with the manual document checking process described earlier. Alternatively, automatic, or semi-automatic, processes may be applied over the labeled dataset to determine relevant keywords for each field.

Figure 4:
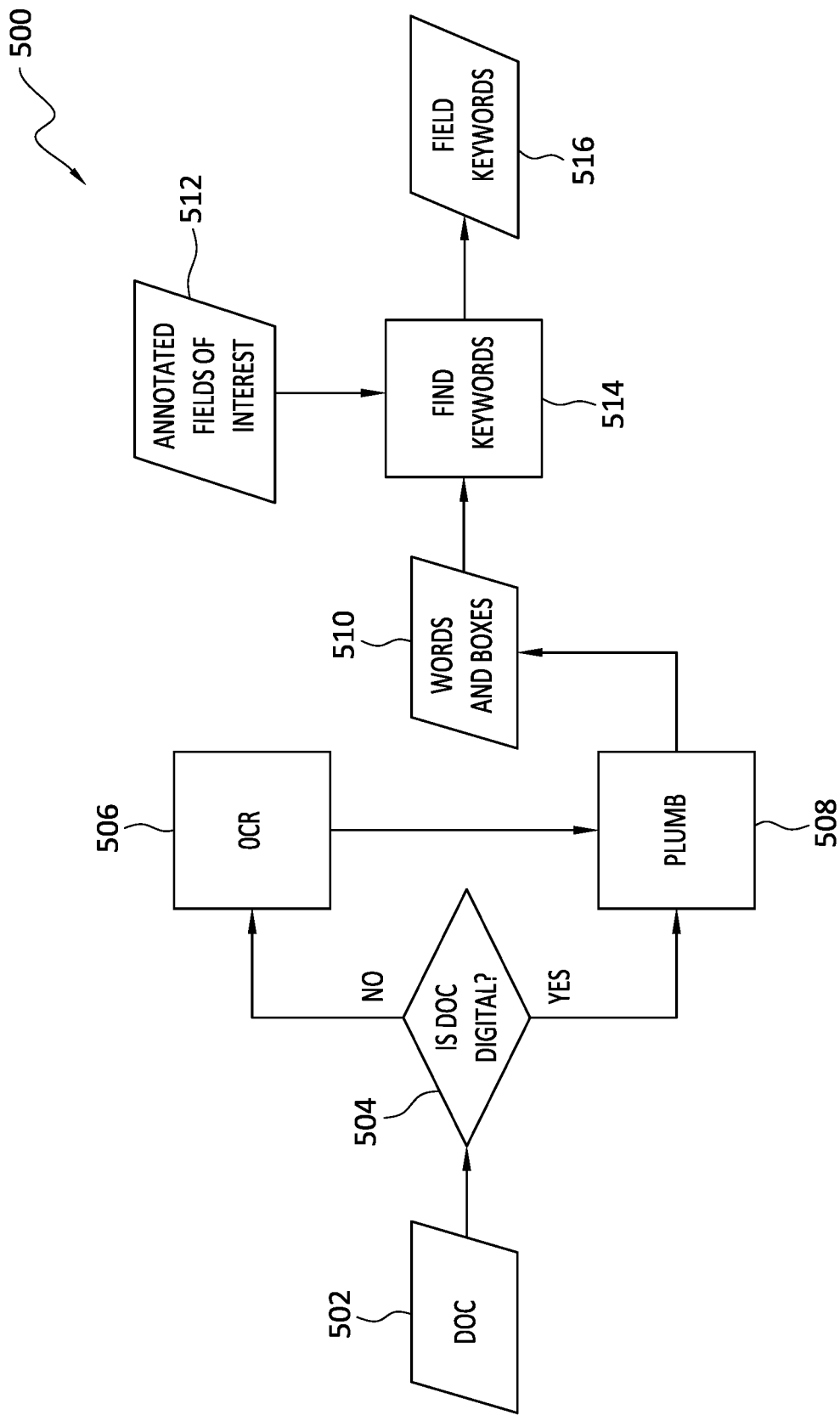
FIG. 4 discloses an example pipeline for word extraction and keyword finding.

With particular reference now to the example of FIG. 4, the method 500 may be applied to a document 502, and may begin with a determination 504 as to whether or not the subject document 502 is in a digital form. If not, such as if the document 502 is in paper form for example, the document 502 may be rendered into, used to create, an electronic form 506, such as with an OCR process for example. On the other hand, if the document 502 is already in an electronic form that will admit of information extraction, the document 502 may be plumbed 508, that is, words, boxes, and/or other information, 510 may be extracted from the document. Once the information 510 has been extracted, the extracted information 510 may be processed to annotate particular fields of interest 512, and the fields of interest 512 searched for keywords 514, so as to identify various keywords in the fields of interest 516.

Attention is directed now to maximal cliques in document layout graphs. Particularly, once the keywords and their respective bounding boxes have been extracted, such as by way of the method 500 for example, a graph of document layouts may be constructed for each field of a document, or group of documents. In this approach, each document field is a node in a graph, and an edge, or line, connecting two nodes represents similarity between the documents with respect to that field.

Figure 5:
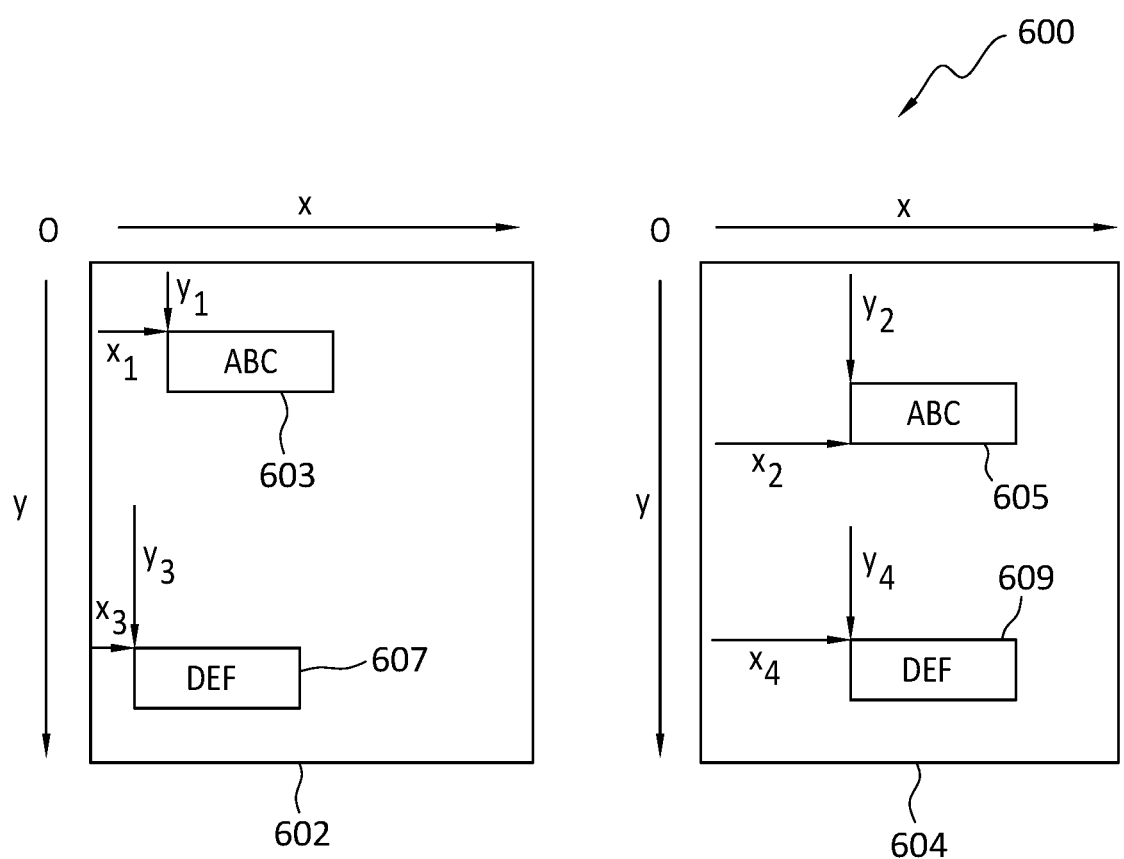
FIG. 5 discloses aspects of some example documents with fields holding data or values targeted for extraction.

With these points in mind, attention is directed to FIG. 5 which provides some context for further discussion of cliques and document layout graphs. FIG. 5 discloses a set 600 of two documents 602 and 604. Both documents 602 and 604 include the same ABC field, denoted at 603 in document 602, and denoted at 604 in document 605. Assuming, for the sake of discussion, that an origin O is located at the upper left corner of the document and defines an intersection of an X axis and Y axis, each of the fields 603 and 605 can be considered in terms of its location with respect to the origin O. Thus, an upper left corner of field 603 is located at (X1, Y1) and an upper left corner of field 605 is located at (X2,Y2), which is different from (X1,Y1). Similarly, the documents 602 and 604 may include a DEF field located in document 602 at (X3,Y3) and in document 604 at (X4,Y4), as shown.

In general, embodiments of the invention may operate to average, or otherwise operate on, the locations of the fields ABC and DEF, in the documents 602 and 604, to determine an extent to which the documents 602 and 604 may be deemed to be similar to each other. In effect, the different locations of the fields ABC 603/605 and DEF 607/609 may serve as a summary of differences between the documents 602 and 604.

In more detail, two documents may be deemed to be similar to each other if the aggregate distance, such as sum, average, or another function, for example, between the document positions of pairs of the same keywords associated with a particular field is below a given threshold. Mathematically, this may be expressed as follows:

$$sim(d1, d2 \mid f) = \begin{cases} 1, & \text{if } \left( \begin{array}{c} \frac{1}{\alpha} * agg(dist(d1, k, d2, k), \\ \forall k \in keys(f)) \end{array} \right) < thres \\ 0, & \text{otherwise} \end{cases}$$

In the equation, d1, d2 are the two documents whose similarity, sim, with respect to field f is to be measured using the aggregation function agg. The function dist measures the geometrical distance, that is, the physical distance, between the locations of a keyword k as that keyword appears in the coordinate space of d1, d2. Each keyword k belongs to the set of keywords, keys(f), associated with field f. The multiplicative factor $\alpha$ indicates the proportion of keywords from keys(f) that appear both in d1 and d2. As a result, the similarity between or among documents may be weighed by the intersection of keywords off appearing in both documents.

Note that the result of application of the sim function may be binary, that is, either 2 documents are similar to each other (sim=1), or the 2 documents are not similar to each other (sim=0), where similarity may be determined with regard to a threshold thres. That is, if the sim function produces a result equal to or greater than thres, sim=0, and if the sim function produces a result less than thres, sim=1.

Figure 6:
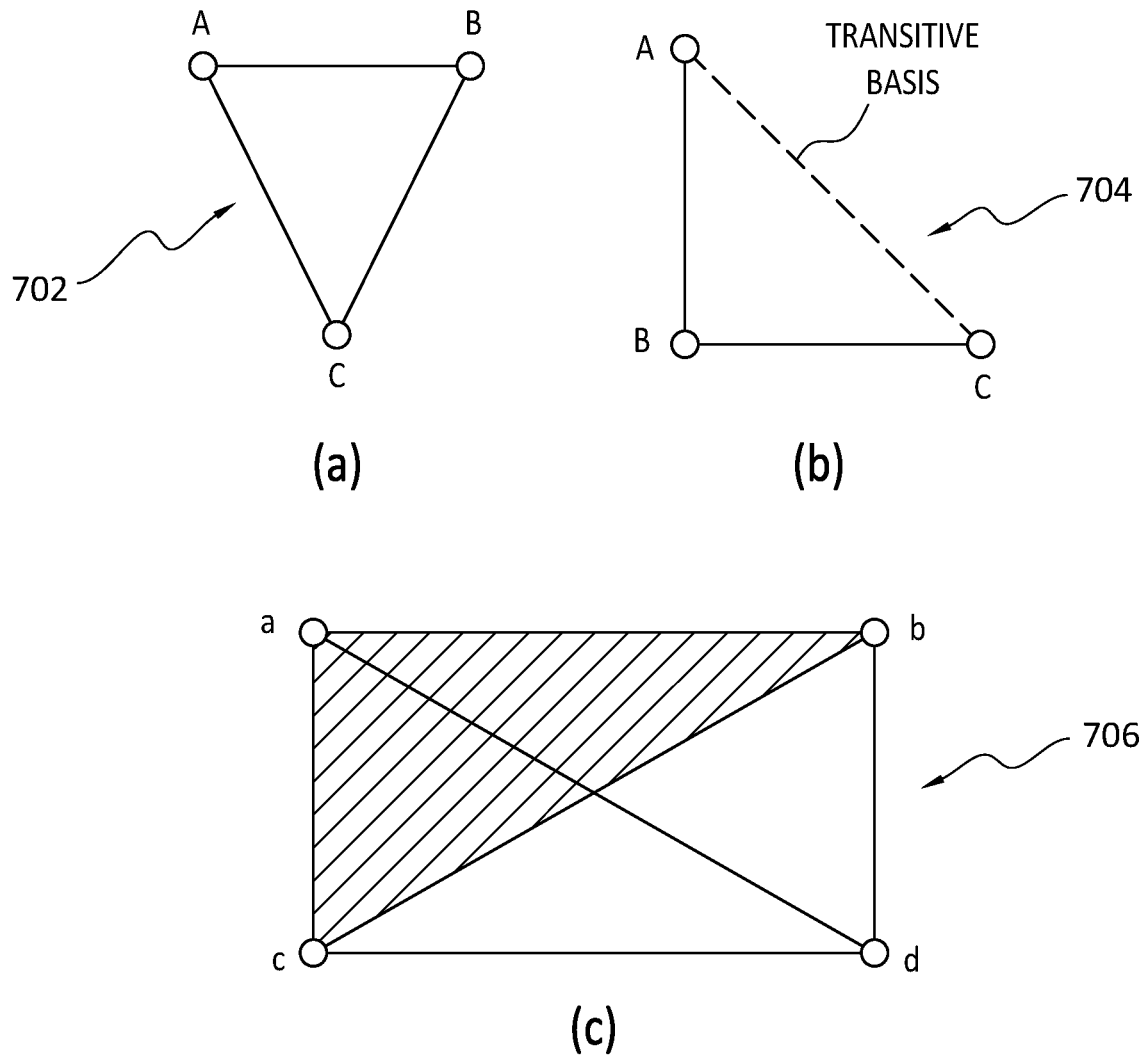
FIG. 6 discloses aspects of some example cliques, or clusters.

With reference next to FIG. 6, some illustrative examples of cliques are indicated. In part (a), a clique 702 is indicated that includes 3 nodes a, b, and c, that are joined by edges a-b, b-c, and a-c. In similar fashion, the clique 704 includes 3 nodes a, b, and c, joined by edges a-b, and b-c. While nodes a and c may not be known to be the same as each other, a mathematical property, the transitive property in this case, may be employed to establish that similarity. Thus, if it is known that a=b, and b=c, application of the transitive property indicates that a=c. That is, due to application of the transitive property, the similarity between nodes a and c may be inferred. Turning next to the clique 706, a maximal clique is illustrated, in which, for a group of nodes a, b, c, and d, all nodes are similar to all other nodes, as evidenced by the connecting edges a-b, b-d, d-c, c-a, a-d, and c-b. Note that one or more of these similarities may be inferred, as discussed above. It is further noted that within the scope of a maximal clique 706, one or more sub-cliques may be defined. Thus, for example a sub-clique a-b-c may be defined, as indicated by the shaded portion. A sub-clique may indicate various fields as being the same/similar, but does not necessarily indicate that the respective documents that include those fields are the same/similar to each other. On the other hand, a maximal clique may indicate a cluster of similar documents.

Figure 7:
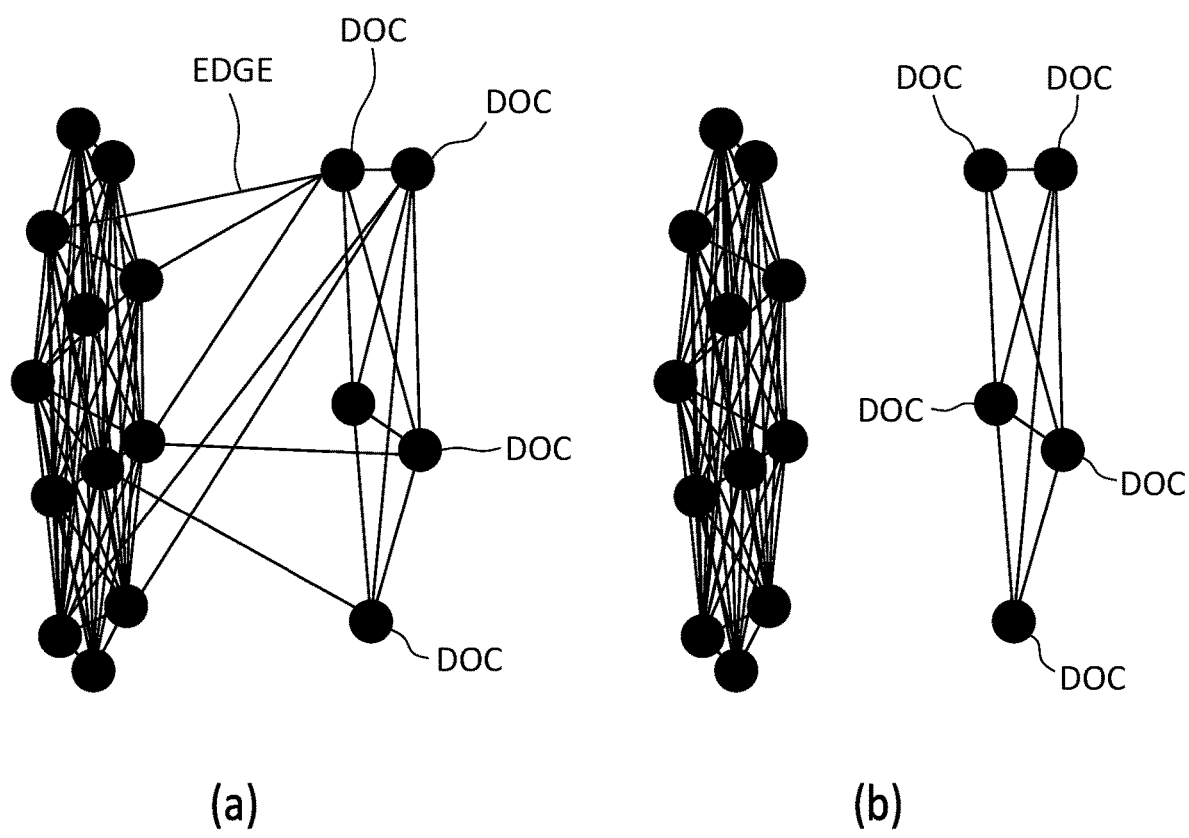
FIG. 7 is a schematic view of an example similarity clustering process.

With reference now to FIG. 7, and continuing reference to the examples of FIG. 6, FIG. 7 presents a schematic view of the similarity clustering process, where (a) indicates a similarity graph of all documents, and (b) indicates maximal cliques, that is, clusters of similar documents. As noted in the discussion of FIG. 6, each node in a graph may connect with all other nodes for which the similarity constraint for field f has been satisfied. After a graph for field f has been constructed by going through all O(N2) document comparisons, a maximal clique finding algorithm may be run on that graph in order to find clusters of similar documents. It may then be assumed, in some embodiments at least, that documents belonging to the same cluster have similar layouts as each other, as shown in part (b) of FIG. 7.

Note that the process of finding cliques may in principle be replaced by a more conventional clustering technique. A benefit of finding cliques however, may be the fact that the process does not depend on knowing the number of clusters a priori, unlike K-Means clustering which requires that the number of clusters beknown, and that it has just one parameter, which is the threshold for determining similarities, unlike other clustering techniques such as DBSCAN.

Figure 8:
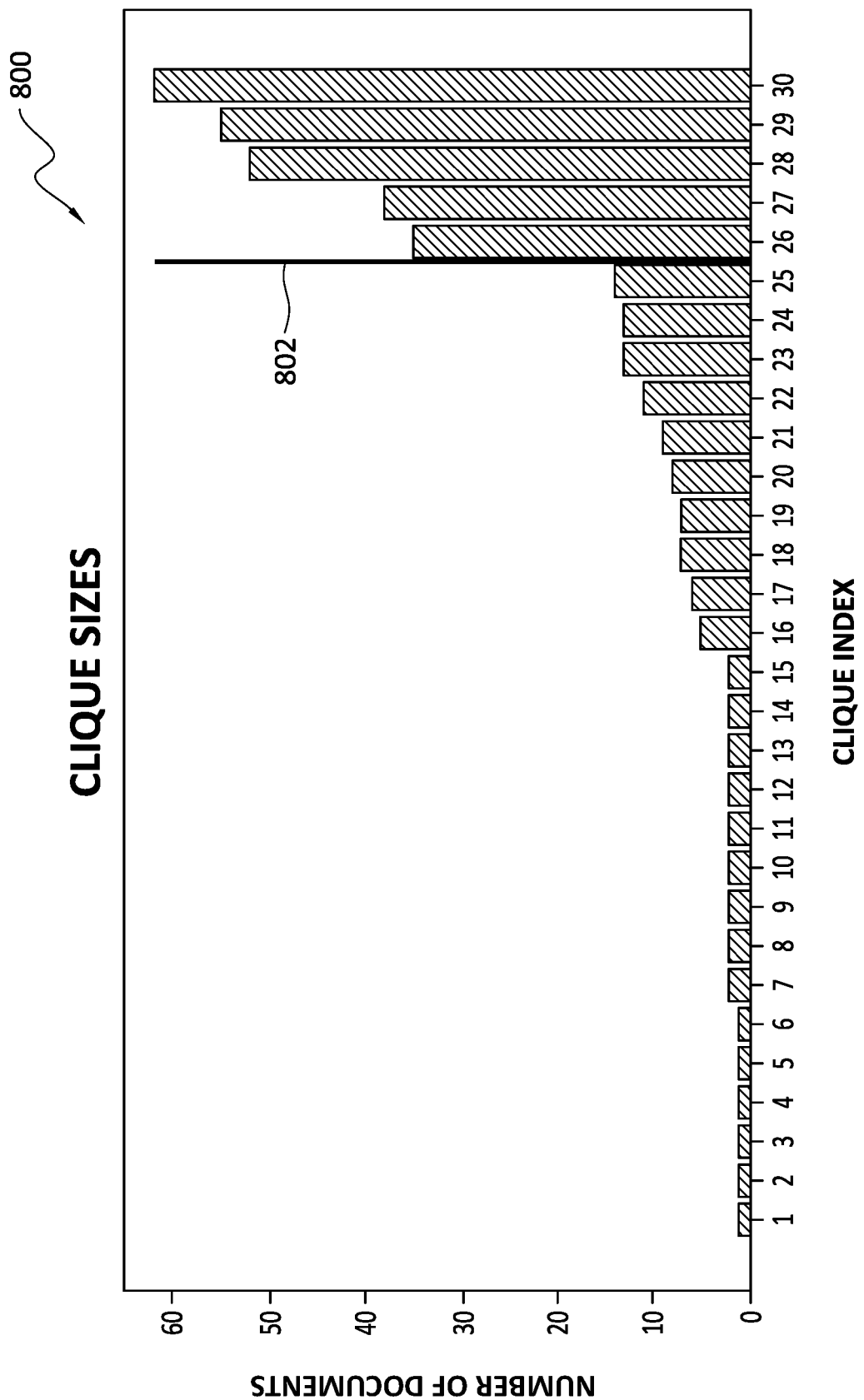
FIG. 8 discloses a sorted list of clique sizes and breakpoint indicating a clique threshold.

With reference next to FIG. 8, various aspects of some example document sets, or cliques, are addressed. In at least some domains, it may be relatively rare to encounter large sets of documents with low layout variability between/among the documents. More commonly, many or most cliques in such domains may tend to have relatively small document counts, which indicates relatively high layout variability among the documents in such domains. Thus, these domains may tend to have more, smaller cliques, and possibly only a few, larger cliques. An example clique distribution for some example domains is shown in the graph 800 of FIG. 8. Specifically, there is a clear breakpoint 802 in the sorted series of clique sizes. In the example of FIG. 8, there are numerous relatively small cliques with about 15 or fewer documents in each, while there are a relatively small number, 5 in the illustrated example, of larger cliques with about 35 or more documents each. In one example domain, purchase order documents from the same type, that is, the same customer, tend to yield the largest sets of documents with similar layouts. Embodiments of the invention may leverage this in the inference stage to improve the efficiency of the decision process.

With such data as shown in FIG. 8, decisions can be made as to what type of information extraction process should be used for the documents in each clique. For example, it may be assumed that it is worthwhile to use a positional method, such as punch-through, for low variability layouts only on large cliques, such as those shown to the right of the breakpoint 802, leaving documents in the other cliques, that is, those cliques to the left of the breakpoint 802, to be used, for example, as training data for an ML algorithm. Thus, example embodiments may operate to find the elbow, or breakpoint, of the sorted list of clique sizes, and then assume that only those cliques with a size larger than the elbow value will be processed by positional methods.

C.2 Example Inference Processes

Given a new document d and a field f, and once the keywords off and their positions from d have been extracted from the document d, example embodiments may determine whether d will be processed by a positional method applicable to low-variability layouts, or by a more sophisticated method applicable to high-variability layouts. The clusters of documents formed during the training phase, and a similar notion of similarity, may be used to make this decision.

An example algorithm may be as follows. For every cluster C generated in the training phase, an embodiment may compute the same aggregate similarity function of the training phase between d and each document $d_i$ belonging to the cluster, and aggregate once again to have a measurement of similarity between d and the whole cluster. Mathematically, $$\text{sim}(d,C|f)=\text{agg}(\text{sim}(d,d_i|f),\forall d_i \in C).$$

In the end, example embodiments may aim to find the cluster C* that minimizes the similarity function. If C* belongs to the group of clusters with size beyond the breakpoint value found in the training phase and if sim(d, C*|f)<thres (threshold), it may be assumed that d is a document with low layout variability for file f, and document d may accordingly be processed by the positional method implemented for cluster C*. On the other hand, if the distance is larger than the threshold, or if C* belongs to the group of remaining clusters, d may be processed by a method such as ML that is better suited, relative to the positional method, for processing documents with high variability layouts.

As noted earlier, in the purchase order use case, there may be situations in which the customer, that is, the document type (such as a PO) is known. In this example scenario, the set of clusters may be pre-filtered so that, after filtering, they contain only those clusters associated with the customer in question, which may accelerate the decision process. In any case, it may be worth searching the entire set of clusters if there is information or a suspicion that the customer changed its purchase order system, leading to a completely different document layout relative to past orders.

C.3 Continuous Training

It is noted that the clique finding method may be used to update the document clusters for every new document processed by the system. In practice, a new document d may be immediately added to cluster C* for field f after being processed if sim(d, C*|f)<threshold. Otherwise, the training phase may be executed again. Either way, the breakpoint value of cluster sizes may need to be computed again.

D. FURTHER DISCUSSION

As will be apparent from this disclosure, example embodiments may possess various useful features and advantages. Following is a non-exhaustive list of some examples.

One such feature concerns the fact that example embodiments may provide automatic, adaptive, and efficient solution for dealing with a large number of documents. Particularly, software for document parsing usually relies on pre-defined layouts to extract information. In contrast, example embodiments embrace methods for grouping documents with similar layouts without a pre-defined user-specification of a layout schema. Then the groups of documents are used to determine whether of not a punch-through method can be performed to extract information.

Another example feature is the clique discovery method for grouping similar layouts together. Particularly, in some example embodiments, the grouping may be performed by a method for finding clicks in an undirected graph formed by document and the similarity between features. This approach contrasts with traditional approaches to information extraction where a predefined layout must be provided.

A final example feature of some embodiments is the ability to implement continuous learning. For example, a significant issue with some machine learning applications in practice is how to keep the deployed model updated with new data. That is, in practice, systems receive large amounts of data for processing, not all data comes from the same data distributions, and the model should be aware of the new set of data. To illustrate, not all data comes from the same set of types, and new types may be employed from time to time, such as receiving purchase orders from new customers. Thus, example embodiments may employ a continuous learning process, where the clusters, or cliques, may be updated with minimum computational effort every time a new document is processed.

E. EXAMPLE METHODS

It is noted with respect to the example methods disclosed herein that any of the disclosed processes, operations, methods, and/or any portion of any of these, may be performed in response to, as a result of, and/or based upon, the performance of any preceding process(es), methods, and/or operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted. Finally, and while it is not required, the individual processes that make up the various example methods disclosed herein are, in some embodiments, performed in the specific sequence recited in those examples. In other embodiments, the individual processes that make up a disclosed method may be performed in a sequence other than the specific sequence recited.

F. FURTHER EXAMPLE EMBODIMENTS

Following are some further example embodiments of the invention. These are presented only by way of example and are not intended to limit the scope of the invention in any way.

Embodiment 1. A method, comprising: for each document in a group of annotated documents: extracting a set of words from the annotated document, and each of the words is positioned in a respective field of the annotated document; and assigning a subset of the words as keywords; using an aggregation function to determine, with respect to a first one of the fields, a similarity of each one of the annotated documents to all of the other annotated documents in the group; creating a document layout graph that comprises nodes, wherein each node of the document layout graph corresponds to a respective annotated document, and each node is connected to all other nodes for which a similarity threshold for the first one of the fields has been met; and running a maximal clique algorithm on the document layout graph to identify a clique of the annotated documents, and each annotated document in the clique has a similar layout to respective layouts of the other annotated documents in Embodiment 2. The method as recited in embodiment 1, further comprising, based on a size of the clique, selecting either a positional method, or a machine learning method, and using the selected method to extract information from the annotated documents in the clique.

Embodiment 3. The method as recited in any of embodiments 1-2, wherein the similarity is assessed with respect to a threshold, and when the similarity meets or exceeds the threshold, the documents compared with the aggregation function are deemed to be similar to each other with respect to the first one of the fields.

Embodiment 4. The method as recited in any of embodiments 1-3, further comprising recording a location of the first one of the fields in each the annotated documents, and wherein the aggregation function assesses similarity based in part on the respective locations of the field in each of the annotated documents.

Embodiment 5. The method as recited in any of embodiments 1-4, wherein identification of the annotated documents in the clique is performed using only the similarity of each of the annotated documents.

Embodiment 6. The method as recited in any of embodiments 1-5, wherein identification of the clique does not require awareness of any other cliques that may exist within the group of annotated documents.

Embodiment 7. The method as recited in any of embodiments 1-6, further comprising evaluating a similarity of a new document with respect to the annotated documents, and updating the clique based on the evaluating.

Embodiment 8. The method as recited in any of embodiments 1-7, further comprising performing, based on the group of annotated documents, an inference process with respect to a new document.

Embodiment 9. The method as recited in embodiment 8, wherein, depending upon an outcome of the inference process, the new document is either added to the clique, or to another clique.

Embodiment 10. The method as recited in embodiment 9, wherein, depending upon which clique the new document is added to, using either a positional method, or a machine learning method, to extract information from the new document.

Embodiment 11. A method for performing any of the operations, methods, or processes, or any portion of any of these, disclosed herein.

Embodiment 12. A computer readable storage medium having stored therein instructions that are executable by one or more hardware processors to perform operations comprising the operations of any one or more of embodiments 1-11.

G. EXAMPLE COMPUTING DEVICES AND ASSOCIATED MEDIA

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated.

In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 9:
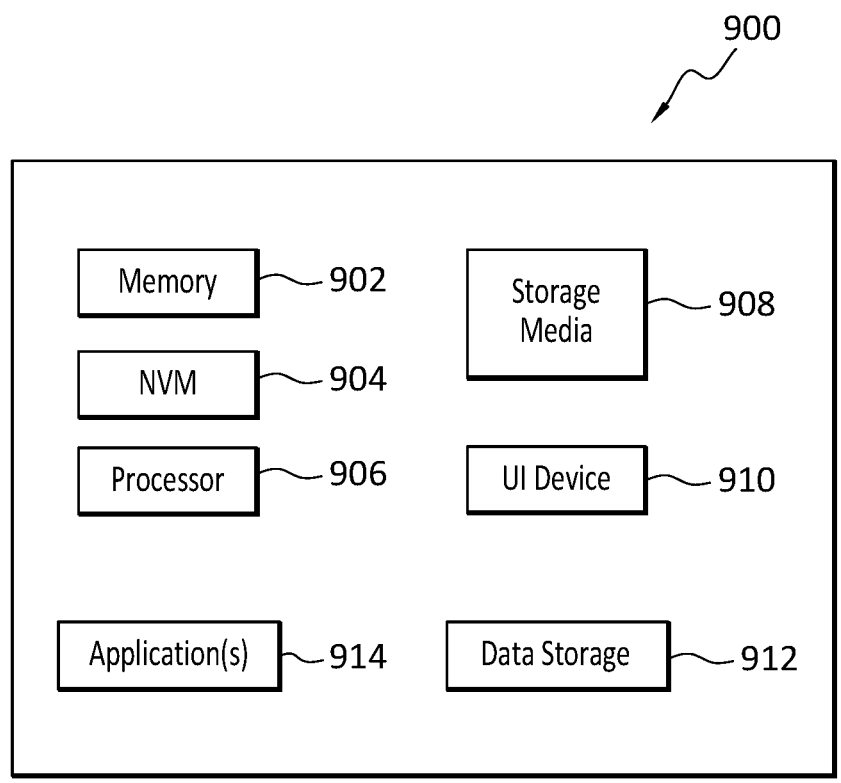
FIG. 9 discloses aspects of an example computing entity operable to perform any of the claimed methods, processes, and operations.

With reference briefly now to FIG. 9, any one or more of the entities disclosed, or implied, by FIGS. 1-8 and/or elsewhere herein, may take the form of, or include, or be implemented on, or hosted by, a physical computing device, one example of which is denoted at 900. As well, where any of the aforementioned elements comprise or consist of a virtual machine (VM), that VM may constitute a virtualization of any combination of the physical components disclosed in FIG. 9.

In the example of FIG. 9, the physical computing device 900 includes a memory 902 which may include one, some, or all, of random access memory (RAM), non-volatile memory (NVM) 904 such as NVRAM for example, read-only memory (ROM), and persistent memory, one or more hardware processors 906, non-transitory storage media 908, UI device 910, and data storage 912. One or more of the memory components 902 of the physical computing device 900 may take the form of solid state device (SSD) storage. As well, one or more applications 914 may be provided that comprise instructions executable by one or more hardware processors 906 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:
1. A method, comprising:
   for each document in a group of annotated documents:
      extracting a set of words from the annotated document, and each of the words is positioned in a respective field of the annotated document; and
      assigning a subset of the words as keywords;

using an aggregation function to determine, with respect to a first one of the fields, a similarity of each one of the annotated documents to all of the other annotated documents in the group;

creating a document layout graph that comprises nodes, wherein each node of the document layout graph corresponds to a respective annotated document, and each node is connected to all other nodes for which a similarity threshold for the first one of the fields has been met;

running a maximal clique algorithm on the document layout graph to identify a clique of the annotated documents, and each annotated document in the clique has a similar layout to respective layouts of the other annotated documents in the clique; and performing, based on the group of annotated documents, an inference process with respect to a new document and, depending upon an outcome of the inference process, the new document is either added to the clique, or to another clique.

2. The method as recited in claim 1, further comprising, based on a size of the clique, selecting either a positional method, or a machine learning method, and using the selected method to extract information from the annotated documents in the clique.

3. The method as recited in claim 1, wherein the similarity is assessed with respect to a threshold, and when the similarity meets or exceeds the threshold, the documents compared with the aggregation function are deemed to be similar to each other with respect to the first one of the fields.

4. The method as recited in claim 1, further comprising recording a location of the first one of the fields in each the annotated documents, and wherein the aggregation function assesses similarity based in part on the respective locations of the field in each of the annotated documents.

5. The method as recited in claim 1, wherein identification of the annotated documents in the clique is performed using only the similarity of each of the annotated documents.

6. The method as recited in claim 1, wherein identification of the clique does not require awareness of any other cliques that may exist within the group of annotated documents.

7. The method as recited in claim 1, further comprising evaluating a similarity of a new document with respect to the annotated documents, and updating the clique based on the evaluating.

8. The method as recited in claim 1, wherein, depending upon which clique the new document is added to, using either a positional method, or a machine learning method, to extract information from the new document.

9. A non-transitory computer readable storage medium having stored therein instructions that are executable by one or more hardware processors to perform operations comprising:

for each document in a group of annotated documents:
extracting a set of words from the annotated document, and each of the words is positioned in a respective field of the annotated document; and
assigning a subset of the words as keywords;

using an aggregation function to determine, with respect to a first one of the fields, a similarity of each one of the annotated documents to all of the other annotated documents in the group;

creating a document layout graph that comprises nodes, wherein each node of the document layout graph corresponds to a respective annotated document, and each node is connected to all other nodes for which a similarity threshold for the first one of the fields has been met;

running a maximal clique algorithm on the document layout graph to identify a clique of the annotated documents, and each annotated document in the clique has a similar layout to respective layouts of the other annotated documents in the clique; and performing, based on the group of annotated documents, an inference process with respect to a new document and, depending upon an outcome of the inference process, the new document is either added to the clique, or to another clique.

10. The non-transitory computer readable storage medium as recited in claim 9, wherein the operations further comprise, based on a size of the clique, selecting either a positional computer readable storage medium, or a machine learning computer readable storage medium, and using the selected computer readable storage medium to extract information from the annotated documents in the clique.

11. The non-transitory computer readable storage medium as recited in claim 9, wherein the similarity is assessed with respect to a threshold, and when the similarity meets or exceeds the threshold, the documents compared with the aggregation function are deemed to be similar to each other with respect to the first one of the fields.

12. The non-transitory computer readable storage medium as recited in claim 9, wherein the operations further comprise recording a location of the first one of the fields in each the annotated documents, and wherein the aggregation function assesses similarity based in part on the respective locations of the field in each of the annotated documents.

13. The non-transitory computer readable storage medium as recited in claim 9, wherein identification of the annotated documents in the clique is performed using only the similarity of each of the annotated documents.

14. The non-transitory computer readable storage medium as recited in claim 9, wherein identification of the clique does not require awareness of any other cliques that may exist within the group of annotated documents.

15. The non-transitory computer readable storage medium as recited in claim 9, wherein the operations further comprise evaluating a similarity of a new document with respect to the annotated documents, and updating the clique based on the evaluating.

16. The non-transitory computer readable storage medium as recited in claim 9, wherein, depending upon which clique the new document is added to, using either a positional method, or a machine learning method, to extract information from the new document.

* * * * *